(12) United States Patent
Coffy et al.

(10) Patent No.: US 8,138,264 B2
(45) Date of Patent: Mar. 20, 2012

(54) BIMODAL POLYETHYLENE RESINS THAT HAVE HIGH STIFFNESS AND HIGH ESCR

(75) Inventors: Tim J. Coffy, Houston, TX (US); Gerhard Guenther, Seabrook, TX (US); Steven D. Gray, Florence, KY (US)

(73) Assignee: Fina Technology, Inc., Houston, TX (US)

( * ) Notice: Subject to any disclaimer, the term of this patent is extended or adjusted under 35 U.S.C. 154(b) by 900 days.

(21) Appl. No.: 11/744,596

(22) Filed: May 4, 2007

(65) Prior Publication Data

US 2008/0275197 A1    Nov. 6, 2008

(51) Int. Cl.
*C08F 4/642* (2006.01)
*C08F 210/16* (2006.01)

(52) U.S. Cl. ............ 525/53; 525/191; 525/240; 526/65; 526/124.2; 526/124.3; 526/124.9

(58) Field of Classification Search .................... 525/53, 525/191, 240; 526/65, 124.2, 124.3, 124.9
See application file for complete search history.

(56) References Cited

U.S. PATENT DOCUMENTS

| | | |
|---|---|---|
| 5,284,613 A | 2/1994 | Ali |
| 5,852,116 A | 12/1998 | Cree |
| 6,034,026 A | 3/2000 | Garoff et al. |
| 2003/0187083 A1* | 10/2003 | Harris .............................. 521/47 |
| 2006/0052237 A1 | 3/2006 | Spaether |
| 2006/0074194 A1* | 4/2006 | Berthold et al. ............... 525/240 |
| 2006/0155058 A1* | 7/2006 | Berthold et al. ................ 525/53 |
| 2006/0189768 A1 | 8/2006 | Marichel |
| 2008/0015318 A1 | 1/2008 | Guenther et al. |
| 2008/0161526 A1 | 7/2008 | Guenther et al. |
| 2009/0036610 A1* | 2/2009 | Jaker ............................. 525/240 |
| 2009/0131595 A1 | 5/2009 | Ameye et al. |
| 2009/0283939 A1* | 11/2009 | Turner et al. .................. 264/500 |

FOREIGN PATENT DOCUMENTS

WO    9747682 A1    12/1997

* cited by examiner

*Primary Examiner* — Roberto Rabago

(57) ABSTRACT

A bimodal polyethylene having a high density ranging from about 0.955 to about 0.959 g/cc, an improved environmental stress cracking resistance (ESCR) of from about 400 to about 2500 hours, and an improved 0.4% flexural modulus of from about 180,000 to about 260,000 psi (1,200 MPa to about 1,800 MPa) may be formed using a Ziegler-Natta polymerization catalyst using two reactors in series. The bimodal polyethylene may have a high load melt index (HLMI) of from about 2 and about 30 dg/min and may be optionally made with a small amount of alpha-olefinic comonomer in the second reactor. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

18 Claims, 5 Drawing Sheets

BIMODAL POLYETHYLENE RESINS THAT HAVE HIGH STIFFNESS AND HIGH ESCR

FIELD OF THE INVENTION

The present invention relates to a process for the production of polyethylene, in particular high density polyethylene (HDPE), and relates more particularly in one non-limiting embodiment to producing polyolefin having a bimodal molecular weight distribution, an improved environmental stress cracking resistance (ESCR) and improved stiffness.

BACKGROUND OF THE INVENTION

For polyethylene, and for high density polyethylene (HDPE) in particular, the molecular weight distribution (MWD) is a fundamental property which determines many properties of the polymer, and thus its applications. It is generally recognized in the art that the MWD of a polyethylene resin may principally determine the physical, and in particular the mechanical, properties of the resin and that the provision of different molecular weight polyethylene molecules may significantly affect the rheological properties of the polyethylene as a whole.

Since an increase in the molecular weight normally improves the physical properties of polyethylene resins, there is a strong demand for polyethylene having high molecular weight. For the purposes of this application, a high molecular weight polyethylene is one having a $M_n$ of at least $1\times10^5$, typically from about $1\times10^5$ to about $1\times10^7$. However, it is the high molecular weight molecules which render the polymers more difficult to process. On the other hand, a broadening of the molecular weight distribution tends to improve the flow of the polymer when it is being processed at high rates of shear. Accordingly, in applications requiring a rapid transformation employing quite high throughputs of the material through a die, for example in blowing and extrusion techniques, the broadening of the molecular weight distribution permits an improvement in the processing of polyethylene at high molecular weight relative to a low melt index of the polyethylene, which is known in the art. It is known that when the polyethylene has a high molecular weight and also a broad molecular weight distribution, the processing of the polyethylene is made easier as a result of the low molecular weight portion and also the high molecular weight portion contributes to a good impact resistance. A polyethylene of this type may be processed utilizing less energy with higher processing yields.

A polymer comprising two groups of molecules with different average molecular masses is said to be bimodal. The manufacture of multimodal polymers is a basic challenge in the field of materials as polymers of this type make it possible to combine, in the same material, the properties of each group of molecules from which it is composed. For example, polymers of high mass introduce good mechanical strength, whereas low masses make it possible to retain, in the material, good fluidity at high temperature, which facilitates its processing.

As discussed above, the high molecular weight fraction provides good mechanical properties to the high density polyethylene and the low molecular weight fraction is required to give good processability to the high density polyethylene. The high molecular weight fraction having relatively high viscosity may lead to difficulties in processing such a high molecular weight fraction. In a bimodal high density polyethylene, the mixture of the high and low molecular weight fractions is adjusted as compared to a monomodal distribution to optimize both the quantity and the molecular weight of high molecular weight species in the polymer. This may provide improved mechanical properties and/or improved processability depending on the end use or the process used to fabricate the end use application.

It is accordingly recognized in the art that it is desirable to have a bimodal distribution of molecular weight in the high density polyethylene. For a bimodal distribution a graph of the MWD as determined for example by gel permeation chromatography may include, provided that the average molecular weight of the two species is sufficiently different, a "shoulder" on the high molecular weight side of the peak of the molecular weight distribution. A resin may have no discernable shoulder and still be bi-modal.

It is a continuing goal of the industry to produce polyethylene having improved properties, such as higher stiffness and higher environmental stress cracking resistance (ESCR) that are important considerations for applications such as pipes, large and small molded parts, and 55-gallon drums and the like.

SUMMARY OF THE INVENTION

In one aspect, the invention is a process for producing a bimodal high density polyethylene in two reactors in series, the process including homopolymerizing in a first reactor a first polyethylene product from ethylene in the presence of hydrogen and a Ziegler-Natta polymerization catalyst; polymerizing in a second, serially connected, downstream reactor a second polyethylene product from ethylene and from about 0 to 3 wt % of an α-olefinic comonomer having from 3 to 8 carbon atoms, based on the total weight of ethylene monomer. The process also includes recovering bimodal polyethylene having a density ranging from about 0.955 to about 0.959 g/cc, a high load melt index (HLMI) of from about 2 and about 30 dg/min, an environmental stress cracking resistance (ESCR) of from about 400 to about 2500 hours, and a 0.4% flexural modulus of from about 180,000 to about 260,000 psi (1,200 MPa to about 1,800 MPa).

In another aspect, the invention is a bimodal high density polyethylene resin produced by a process including homopolymerizing in a first reactor a first polyethylene product from ethylene in the presence of hydrogen and a Ziegler-Natta polymerization catalyst; polymerizing in a second, serially connected, downstream reactor a second polyethylene product from ethylene and from about 0 to 3 wt % of an α-olefinic comonomer having from 3 to 8 carbon atoms, based on the total weight of ethylene monomer. The process also includes recovering bimodal polyethylene having a density ranging from about 0.955 to about 0.959 g/cc, a high load melt index (HLMI) of from about 2 and about 30 dg/min, an environmental stress cracking resistance (ESCR) of from about 400 to about 2500 hours, and a 0.4% flexural modulus of from about 180,000 to about 260,000 psi (1,200 MPa to about 1,800 MPa).

In yet another aspect, the invention is an article made from a resin produced by a process including homopolymerizing in a first reactor a first polyethylene product from ethylene in the presence of hydrogen and a Ziegler-Natta polymerization catalyst; polymerizing in a second, serially connected, downstream reactor a second polyethylene product from ethylene and from about 0 to 3 wt % of an α-olefinic comonomer having from 3 to 8 carbon atoms, based on the total weight of ethylene monomer. The process also includes recovering bimodal polyethylene having a density ranging from about 0.955 to about 0.959 g/cc, a high load melt index (HLMI) of from about 2 and about 30 dg/min, an environmental stress cracking resistance (ESCR) of from about 400 to about 2500 hours, and a 0.4% flexural modulus of from about 180,000 to about 260,000 psi (1,200 MPa to about 1,800 MPa). The article is prepared by a process selected from the group of processes consisting of blow-molding, injection-molding, extrusion, transfer compression molding, and thermoforming.

DETAILED DESCRIPTION OF THE INVENTION

Figure 1:
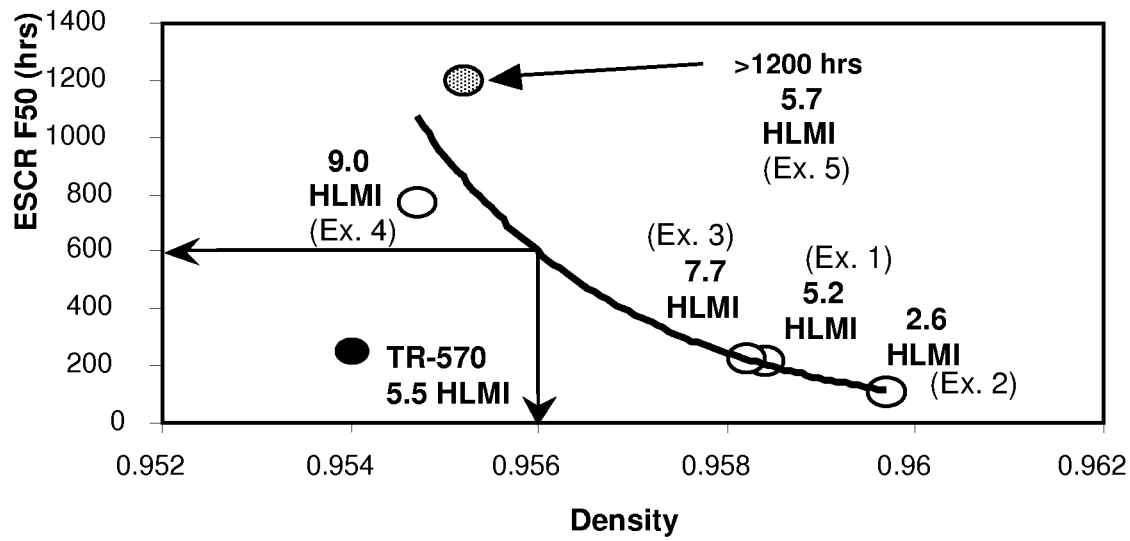
FIG. 1 is a graph of ESCR results (at F50, condition B, 10% Igepal) for experimental bimodal drum resins as a function of density, and compared to FINA TR-570 polyethylene.

The present invention relates to the production of polyethylene having a broad molecular weight distribution, and in particular a bimodal molecular weight distribution, which also has high stiffness and high ESCR.

Herein, flexural modulus is measured in psi (kPa) at 0.4% strain according to common procedures. ESCR evaluates the time a container can withstand an aggressive liquid (e.g. detergent, oil, agricultural chemicals, etc.) under mechanical stress (e.g. pressure, top load, deformation, molded in stress, etc.). Conditions of service (e.g. temperature, stress, bottle molding conditions and container design) strongly influence the results. Herein in the ESCR measurements, F50 refers to the time taken (in hours) to achieve 50% failure under well-recognized Condition B 10% Igepal.

Accordingly, there is provided a process for producing high density polyethylene in the presence of a Ziegler-Natta catalyst system in two continuous stirred tank reactors (CSTRs) in series where in a first reactor a first polyethylene product is polymerized substantially by homopolymerization of ethylene in the presence of hydrogen, and in a second reactor serially connected downstream to the first reactor, a second polyethylene product is copolymerized from ethylene and an α-olefinic comonomer comprising from 3 to 8 carbon atoms.

It has been observed that the production of, respectively, low and high molecular weight fractions of polyethylene in the first and second reactors in a series may unexpectedly yield high density polyethylene having a bimodal molecular weight distribution with improved mechanical properties, such as high stiffness and high ESCR. High stiffness which accompanies high molecular weight typically is observed with low ESCR properties where there is very little resistance to stress cracking. For the purposes of this patent application, a polyethylene polymer having a bimodal molecular weight distribution will have a GPC curve showing either two separate peaks or a substantially broadened and asymmetrical peak. Typically the low molecular weight distribution peak will occur at a range of from about $1 \times 10^3$ to about $1 \times 10^5$ and the high molecular weight peak will occur at a range of from about $1 \times 10^5$ to about $1 \times 10^7$. Surprisingly, the high stiffness is at a constant density and higher than that of some unimodal resins, such as a Chromium catalyzed polymer.

Bimodal polymers are desirable because such polymers generally exhibit both good mechanical properties, in particular impact strength (measured by the Izod and/or Charpy test, ISO Standard 180 and ISO Standard 179 respectively), and better performance at high temperatures, which is reflected by a high Vicat point and a higher heat deflection temperature or HDT (Vicat: ISO Standard 306, HDT: ISO Standard 75); the good mechanical properties deriving in particular from the population with high molecular weight portions, and, secondly, are easy to process, in particular by conversion technologies known to a person skilled in the art (extrusion, injection molding, transfer compression molding, thermoforming), due in this instance to the presence of the population with low molecular weight portions.

Without wishing to be bound by any one theory, it is believed that these unexpected technical effects result from the absence, or presence in only minor amounts, of comonomer in the first reactor, leading to a higher stiffness of the combined material as compared to a unimodal product of the same density.

In the one non-restrictive embodiment, the polymerization processes are carried out in the liquid phase in an inert diluent, the reactants including ethylene and hydrogen for homopolymerization and for copolymerization ethylene and, as appropriate, an alpha-olefinic comonomer comprising from 3 to 8 carbon atoms. In an embodiment, the comonomer may be selected from 1-butene, 1-pentene, 1-hexene, 4-methyl 1-pentene, 1-heptene and 1-octene. The inert diluent may comprise isobutene or hexane or the like.

The polymerization processes may be carried out at a temperature of from about 100 to about 250° F. (about 38 to about 93° C.), in one non-restrictive embodiment from about 150 to about 190° F. (about 66 to about 88° C.), under an absolute pressure of about 100 to 10,000 kPa (about 14.5 to about 1,450 psi).

In the first reactor, the ethylene monomer may comprise from 0.1 to 3% by weight based on the total weight of the ethylene monomer in the inert diluent and the hydrogen may comprise from 0.1 to 5 mol % on the same basis. In another non-limiting embodiment, the composition in the first reactor comprises 0.5% by weight ethylene and 0.1 mol % hydrogen. The polymerization product from the first reactor may have a melt index MI5 of from about 50 to about 2000 dg/min, and in another non-limiting embodiment, from about 200 to about 800 dg/min, the melt index MI5 being measured determined using the procedures of ASTM D1238 using a load of 5 kg at a temperature of 190° C. The melt index MI5 is broadly inversely indicative of the molecular weight of the polymer. In other words, a low melt index is indicative of a high molecular weight for the polymer and vice versa. In one non-limiting embodiment, the relatively low molecular weight polyethylene fraction produced in the first reactor comprises from 30 to 70% by weight, more typically around 40-60% by weight, such as a split of about 49/51 to about 51/49, up to about 57/43 to about 43/57, of the total polyethylene produced in the first and second serially connected reactors.

In the second reactor, the comonomer as described above is introduced into the second reactor in relatively small amounts e.g. in one non-limiting embodiment from about 0 to about 5 wt % based on the total amount of ethylene fed, and in another non-restrictive version from about 0.1 to about 2 wt % on the same basis. Accordingly, in the copolymerization process carried out in the second reactor, the comonomer, which is typically 1-hexene, 1-butene or the like, is reacted with the ethylene monomer to form a relatively high molecular weight polyethylene fraction in the second reactor in a controllable manner.

The temperature in the second reactor may be lower than that in the first reactor in, in one non-limiting example the temperature is from about 166 to about 186° F. (about 74 to about 86° C.) in the second reactor as opposed to about 173 to about 193° F. in the first reactor (about 78 to about 89° C.); and in another non-restrictive version from about 173 to about 179° F. (about 78 to about 82° C.) in the second reactor as opposed to 180 to about 186° F. (about 82 to about 86° C.) in the first reactor. The ethylene monomer may comprise from about 0.1 to about 2% by weight, typically around 0.8% by weight based on the total weight of the monomer and comonomer and the inert diluent, and the comonomer comprises from 0 to about 5% by weight, typically around 0 to about 2% by weight of the total ethylene feed.

In one embodiment, the process of the invention is done at constant pressure. In such a process, the Ziegler-Natta catalyst is injected into the process stream in an amount sufficient to maintain the pressure.

The final polyethylene, comprising in admixture the low molecular weight polyethylene fraction produced in the first reactor and conveyed through the second reactor and the high molecular weight polyethylene fraction produced in the second reactor, may have a high load melt index (HLMI), determined using the procedures of ASTM D1238 using a load of 21.6 kg at a temperature of 190° C., of from about 2 to about 30 g/10 mins, and in another non-restrictive embodiment from about 3 to about 16 dg/min. The bimodal polyethylene recovered has a density ranging from about 0.950 to about 0.965 g/cc, an ESCR of from about 400 to about 2500 hours, and a 0.4% flexural modulus of from about 180,000 to about 260,000 psi (1200 MPa to about 1,800 MPa). In another non-restrictive version, the bimodal polyethylene recovered has a density ranging from about 0.955 to about 0.959 g/cc, an ESCR of from about 400 to about 1200 hours, and a 0.4% flexural modulus of from about 220,000 to about 240000 psi (1,500 MPa to about 1,600 MPa). The final product may have a molecular weight distribution MWD (the ratio of Mw/Mn) of from 8 to 20, or in an alternative embodiment, from 10-18.

It has been found that the process herein may yield bimodal high density polyethylene having properties which make them particularly suitable for use as polyethylene resins for the manufacture of small and large parts, pipes, drums, tubes, profiles and the like, through known processes such as injection molding, blow molding, extrusion, transfer compression molding, thermoforming and the like. Since no comonomer is incorporated into the low molecular weight fraction, even if the polymer as a whole has the same molecular weight distribution as in a known polymer the resultant polymer will have improved properties. Thus, the clear distinction in the production of the low and high molecular weight fractions in the process gives improved bimodality of the molecular weight distribution which in turn improves the mechanical properties such as the stiffness and ESCR of the polyethylene resin when used for pipes, tubes and drums.

In general, the polymerization catalysts suitable in this process may be those having stalwart morphology and robust integrity in that their physical structure is maintained in feeding systems and under intense reactor conditions. The catalysts may have a good compromise between efficiency and sensitivity meaning a manageable response to changes in production variables (e.g. $H_2$ feed rates, aluminum alkyl co-catalysts, comonomer feed rates, temperatures, pressures, etc). The catalyst may have high mileage, namely, the catalyst lifetime and activity may match residence times, and the catalyst may maximize productivity and lower costs, polymer residues, and additives. In one non-restrictive embodiment, the catalyst may provide appropriate powder morphology for products and processes. Powder replicates catalyst; thus, high bulk density and low fines are desired to allow powder to be readily cut from diluent and conveyed to finishing. Powder should not, however be too large; a small but uniform particle size distribution favors bimodal homogeneity. The catalyst may yield PE with appropriate MWD and comonomer distribution. That is, for optimal final product properties, the catalyst may provide narrow polydispersity for uniform comonomer incorporation. Too narrow a MWD, however, will prevent good processing. The catalyst may provide high homopolymer densities. For good properties, a linear polymer is desired, in one non-restrictive embodiment. This gives a high homopolymer density and allows better segregation of comonomer into property-enhancing high MW portion of bimodal distribution.

In one embodiment, the catalyst preparation can be generally described as comprising at least three steps: (1) preparation of a dialkoxide as the reaction product of a metal dialkyl and an alcohol; (2) preparation of a soluble catalyst precursor as the reaction product of the metal dialkoxide and a halogenating/titanating agent; and (3) combining the products from steps 1 and 2 and precipitation of a final solid catalyst component as the reaction product of the soluble catalyst precursor and a precipitating agent. The precipitating agent may in some embodiments also be a halogenating/titanating agent. While additional steps may also be included in practicing the invention, as will be known to those skilled in the art, such as, for example, additional halogenating/titanating steps, the three enumerated steps are considered to be those conventionally employed, although execution of each step may occur at a different site or manufacturing facility.

The metal dialkyls may include Group IIA metal dialkyls. The metal dialkyl can be, for example, a magnesium dialkyl. Suitable and non-limiting examples include diethyl magnesium, dipropyl magnesium, dibutyl magnesium, butylethyl magnesium (BEM), and the like. In one embodiment butylethyl magnesium is employed.

The alcohol can be, in one embodiment, any compound conforming to the formula $R^1OH$ and yielding the desired metal dialkoxide upon reaction as described hereinabove may be utilized. In the given formula $R^1$ is an alkyl group of 2 to 20 carbon atoms. Non-limiting examples of suitable alcohols include ethanol, propanol, isopropanol, butanol, isobutanol, 2-methyl-pentanol, 2-ethylhexanol, and the like. While it is believed that almost any alcohol may be utilized, whether linear or branched, a higher order branched alcohol, for example, 2-ethyl-1-hexanol (also called 2-ethylhexanol), may be utilized in particular embodiments.

The amount of alcohol relative to the metal dialkyl may vary over a wide range, provided that the result is the desired metal alkoxide. For example, a level of from about 0.01 to about 10 equivalents of alcohol relative to the metal dialkyl may be employed. In some embodiments a level ranging from about 0.5 to about 6 equivalents may be used, and in other embodiments a level ranging from about 1 to about 3 equivalents may be selected.

A problem that may be encountered when a selected metal dialkyl is added to a solution is a dramatic increase in the solution's viscosity. This undesirably high viscosity can be reduced in by adding an aluminum alkyl co-catalyst to the solution, such as, for example, triethyl aluminum (TEAl), which operates to disrupt the association between the individual alkyl metal molecules. In the practice of the invention, rather than use TEAl, other alkyl aluminums known to those of ordinary skill to be useful may be used, such as, for example, triisobutyl aluminum (TIBAl); Al(n-octyl)(O-Bu)$_2$; tri-n-hexyl aluminum; tri-n-octyl aluminum (TNOAl); and the like. Mixtures of the cocatalysts may also be used. In some embodiments it is therefore desirable to include the alkyl aluminum, in an alkyl aluminum-to-metal ratio of from 0.001:1 to 1:1. In other embodiments the ratio can be from 0.01:1 to 0.5:1; and in still other embodiments the ratio can be from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

In the practice of an embodiment of the invention the metal dialkoxide produced by the reaction of dialkyl metal and alcohol may be a magnesium compound of the general formula Mg(OR$^2$)$_2$ wherein R$^2$ is a hydrocarbyl or substituted hydrocarbyl of 1 to 20 atoms. In one embodiment the metal dialkoxide is non-reducing. Non-limiting examples of species of metal dialkoxides which can be used include magnesium di(2-ethylhexoxide) and other Group IIA metal dialkoxides, may be produced by reacting an alkyl magnesium compound (MgR$^3$R$^4$, i.e., a metal dialkyl wherein R$^3$ and R$^4$ are each independently any alkyl group of 1 to 10 carbon atoms) with an alcohol (R$^{10}$H) and an aluminum alkyl (AlR$^5{}_3$ wherein R$^5$ is any alkyl group of 1 to 10 carbon atoms. Suitable MgRR' compounds include, for example, diethyl magnesium, dipropyl magnesium, dibutyl magnesium, and butylethyl magnesium (BEM). The MgR$^3$R$^4$ compound can be BEM, wherein the reaction products, in addition to the magnesium dialkoxide, are denoted as R$^3$H and R$^4$H and are butane and ethane, respectively.

In the second step of the generalized reaction scheme, the metal dialkoxide is reacted with a halogenating agent to form a soluble catalyst precursor. It is significant that this step can be accomplished in one or several parts. In this case a compound conforming to the formula ClAR$^6{}_x$ may in some embodiments be selected as the halogenating agent. In the formula A is a nonreducing oxyphilic compound which is capable of exchanging one chloride for an alkoxide, R$^6$ is a hydrocarbyl or substituted hydrocarbyl, and x is the valence of A minus 1. Examples of A include titanium, silicon, aluminum, carbon, tin and germanium, and in some embodiments titanium or silicon wherein x is 3. Where titanium is included, the agent is referred to as a halogenating/titanating agent. Examples of R$^6$ include methyl, ethyl, propyl, isopropyl and the like having from 2 to 6 carbon atoms. A non-limiting example of a halogenating/titanating agent that can be used is ClTi(O$^i$Pr)$_3$ and, as a halogenating agent, ClSiMe$_3$, wherein Me is methyl.

The halogenation is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is, in some embodiments, in the range of about 6:1 to about 1:3, and in other embodiments from about 3:1 to 1:2, and in still other embodiments from about 2:1 to 1:2, and in yet other embodiments is about 1:1.

Halogenation can be carried out at a temperature from about 0° C. to about 100° C. and for a reaction time in the range of from about 0.5 to about 24 hours. In other embodiments a temperature of from about 20° C. to about 90° C. can be used, and the reaction time can range from about 1 hour to about 4 hours.

The halogenation, in this case, chlorination, that takes place results in a reaction product which is the soluble catalyst precursor, which may in some embodiments be of uncertain composition. Regardless of the constituents or the nature of their association, in this embodiment, the catalyst precursor is substantially soluble, which is defined herein as at least about 90 percent by weight, and in desirable embodiments more than about 95 percent by weight, in the catalyst synthesis solution.

Following formation of the soluble catalyst precursor, a halogenating/titanating agent is used for the purpose of precipitating the desired final solid catalyst component, i.e., thereby providing a supported catalyst. Thus, this agent is herein referred to as the "precipitating agent" in order to more clearly separate it, by virtue of its effect, from other halogenating agents, some of which may contain titanium and therefore double as titanating agents, that are used in forming the soluble catalyst precursor via reaction of that agent with the metal dialkoxide.

The precipitating agent can be, in some embodiments, blends of two tetra-substituted titanium compounds with all four substituents being the same and the substituents being a halide. In other embodiments, the precipitating agent may be a single compound. If a blend is chosen, a combination of a titanium halide and an organic titanate may, in some embodiments, be selected. For example, a blend of TiCl$_4$ and Ti(OBu)$_4$, wherein Bu is butyl, may be utilized. In some desirable embodiments a blend of Ti(OBu)Cl$_3$ and Ti(OBu)$_2$Cl$_2$ is selected as the precipitating agent. Where a blend of TiCl$_4$ and Ti(OBu)$_4$ is selected, for example, the proportion of the constituents may vary over a range of from 0.5:1 to 6:1, and in some embodiments from about 2:1 to 3:1. The support is generally composed of an inert solid, which is chemically unreactive with any of the components of the conventional Ziegler-Natta catalyst. In some embodiments, where magnesium containing starting materials are selected, the support is often a magnesium compound. Examples of the magnesium compounds which can be used to provide a support source for the catalyst component are magnesium halides, dialkoxymagnesium, alkoxymagnesium halides, magnesium oxyhalides, dialkylmagnesiums, magnesium oxide, magnesium hydroxide, and carboxylates of magnesium.

The amount of precipitating agent utilized is desirably sufficient to precipitate a solid product from the solution. Desirable embodiments include employing a precipitating agent concentration of from about 0.5:1 to about 5:1, typically from about 1:1 to about 4:1, and in certain embodiments in the range of from about 1.5:1 to about 2.5:1.

In some embodiments the precipitation is carried out at room temperature. The solid catalyst component is then recovered by any suitable recovery technique known to those skilled in the art, and then desirably washed at room/ambient temperature with a solvent, such as hexane. Generally, the solid catalyst component is washed until the [Ti] is less than about 100 mmol/L. In the invention [Ti] represents any titanium species capable of acting as a second generation Ziegler catalyst, which would comprise titanium species that are not part of the reaction products as described herein. The resulting catalyst component may then, in some embodiments, be subjected to additional halogenation/titanation steps, if desired, to produce alternative and/or additional catalyst products. After each halogenation/titanation step the solid product can be washed until the [Ti] is less than a desired amount, for example, less than about 100 mmol/L, less than about 50 mmol/L, or less than about 20 mmol/L. Following the final halogenation/titanation step, whether it is the precipitation step per se or a step subsequent thereto, the product can be washed until the [Ti] is less than a desired amount, for example, less than about 20 mmol/L, less than about 10 mmol/L, or less than about 1.0 mmol/L.

Where use of halogenation/titanation agents are desired following the precipitation step, a titanium halide, such as titanium tetrachloride ($TiCl_4$), may be selected. In this case the halogenation/titanation agent is added to the slurry. While this addition is often carried out at ambient/room temperature, it may also be carried out at other temperatures and pressures and under a variety of conditions. The amount of such additional agent may be in a titanium to magnesium ratio of from about 0.1 to 5.0 equivalents, in some embodiments desirably about 2.0, and in other embodiments from about 0.25 to about 4, in still other embodiments from about 0.3 to about 3 equivalents, and in still other embodiments from about 0.4 to about 2.0 equivalents. In one desirable embodiment, the amount of the halogenating/titanating agent utilized in post-precipitation steps may be from about 0.45 to about 1.5 equivalents.

Optionally, an electron donor may also be employed, during the halogenation/titanation, to produce the soluble catalyst precursor; during the precipitation, to produce the (solid) catalyst component; or during subsequent halogenations/titanations, to produce alternative catalyst components. Electron donors useful in the preparation of polyolefin catalysts are well known in the art, and any suitable electron donor that will provide a suitable catalyst may be used. Electron donors, also known as Lewis bases, are typically organic compounds of oxygen, nitrogen, phosphorus, or sulfur which are capable of donating an electron pair to the catalyst.

Such an electron donor may be a monofunctional or polyfunctional compound, and can be selected from among the aliphatic or aromatic carboxylic acids and their alkyl esters, the aliphatic or cyclic ethers, ketones, vinyl esters, acryl derivatives, particularly alkyl acrylates or methacrylates, and silanes. An example of a suitable electron donor is di-n-butyl phthalate. A generic example of a suitable electron donor is an alkylsilylalkoxide of the general formula $RSi(OR')_3$, e.g., methylsilyltriethoxide [$MeSi(OEt_3)$], where R and R' are alkyls with 1-5 carbon atoms and may be the same or different.

An internal electron donor may be used in the synthesis of the catalysts and an external electron donor, or stereoselectivity control agent (SCA), to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donor compounds with nitrogen, phosphorus and/or sulfur atoms, and specific classes of esters. Particularly suitable are the esters of phthalic acid, such as diisobutyl, dioctyl, diphenyl and benzylbutylphthalate; esters of malonic acid, such as diisobutyl and diethyl malonate; alkyl and aryl pivalates; alkyl, cycloalkyl and aryl maleates; alkyl and aryl carbonates, such as diisobutyl, ethylphenyl, and diphenyl carbonate; and succinic acid esters, such as mono and diethyl succinate.

External electron donors which may be utilized in the preparation of a catalyst according to the present invention include organosilane compounds such as alkoxysilanes of the general formula $SiR_m(OR')_{4-m}$ wherein R is selected from the group consisting of alkyl, cycloalkyl, aryl and vinyl groups; R' is an alkyl group; and m is 0-3, wherein R may be the same as R'; and further wherein, when m is 0, 1 or 2, the R' groups may be the same or different; and when m is 2 or 3, the R groups may be the same or different.

The external electron donor useful in the invention can be selected from a silane compound of the following formula:

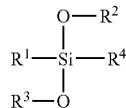

wherein $R^1$ and $R^4$ are both an alkyl or cycloalkyl group containing a primary, secondary or tertiary carbon atom attached to the silicon, $R^1$ and $R^4$ being the same or different; and $R^2$ and $R^3$ are alkyl or aryl groups. $R^1$ may be methyl, isopropyl, isopentyl, cyclohexyl, or t-butyl; $R^2$ and $R^3$ may be methyl, ethyl, propyl or butyl groups and are not necessarily the same; and $R^4$ may also be methyl, isopropyl, cyclopentyl, cyclohexyl or t-butyl. Specific external electron donors are cyclohexyl methyldimethoxy silane (CMDS), diisopropyl dimethoxysilane (DIDS), cyclohexylisopropyl dimethoxysilane (CIDS), dicyclopentyl dimethoxysilane (CPDS) and di-t-butyl dimethoxysilane (DTDS).

The catalyst component made as described hereinabove may be combined with an organometallic catalyst component (a "preactivating agent") to form a preactivated catalyst system suitable for the polymerization of olefins. Typically, the preactivating agents which are used together with the catalyst component of the invention are organometallic compounds such as aluminum alkyls, aluminum alkyl hydrides, lithium aluminum alkyls, zinc alkyls, magnesium alkyls and the like. Organoaluminum compounds are used in some embodiments. Where such is selected it is frequently an aluminum alkyl of the formula $AlR_3$ wherein at least one R is an alkyl having 1-8 carbon atoms or a halide, and wherein each R may be the same or different.

In another non-limiting embodiment, the Ziegler-Natta catalysts of U.S. Pat. No. 6,174,971 are suitable for use in the instant process, and this patent is incorporated herein by reference in its entirety. In one non-restrictive embodiment the synthesis of these Ziegler-Natta catalysts uses a multi-step preparation that includes treating a soluble magnesium compound with successively stronger chlorinating-titanating reagents. The catalysts polymerize olefins, particularly ethylene, to produce a polymer with low amount of fines, large average fluff particle size and narrow molecular weight distribution. The catalyst has high activity and good hydrogen response.

In a different non-limiting embodiment, the polymerization catalyst may be that described in U.S. Patent Application Publication 2004/0058803A1, also incorporated herein in its entirety by reference. This document concerns a Ziegler-Natta type catalyst component that may be produced by a process involving contacting a magnesium dialkoxide compound with a halogenating agent to form a reaction product A, and contacting reaction product A with a first, second and third halogenating/titanating agents. The reaction products may be washed with a hydrocarbon solvent to reduce titanium species [Ti] content to less than about 100 mmol/L. In another non-limiting embodiment, these Ziegler-Natta polymeriza- 70 lb/hr (31.7 kg/hr) and there was no mother liquor contribution to Reactor One in all Examples. The hydrogen feed to Reactor One was 25.5 g/hr.

The average residence time in Reactor Two for each experiment was 1.0 hr. Fresh hexane feed to Reactor Two was 5 lb/hr (2.3 kg/hr).

TABLE I

Production Conditions and Polymer Data, Experiments 1-5

| | Example Number | | | | |
|---|---|---|---|---|---|
| | 1 | 2 | 3 | 4 | 5 |
| Reactor One | | | | | |
| Pressure, psig (MPa) | 129 (0.89) | 128 (0.88) | 128 (0.88) | 130 (0.90) | 130 (0.90) |
| Temperature °F. (°C.) | 183 (84) | 183 (84) | 183 (84) | 183 (84) | 183 (84) |
| Ethylene, lb/h (kg/hr) | 33.7 (15.3) | 33.7 (15.3) | 32.8 (14.9) | 33.7 (15.3) | 33.3 (15.1) |
| Vapor $H_2/C_2$ Ratio | 2.13 | 2.58 | 2.19 | 1.87 | 1.82 |
| MI5 (dg/min) | 490 | 527 | 545 | 502 | 516 |
| Reactor Two | | | | | |
| Pressure, psig (MPa) | 36 (0.25) | 32 (0.22) | 41 (0.28) | 41 (0.28) | 37 (0.25) |
| Temperature °F. (°C.) | 176 (80) | 176 (80) | 176 (80) | 176 (80) | 176 (80) |
| Ethylene, lb/h (kg/hr) | 34.8 (15.8) | 36.4 (16.5) | 34.1 (15.5) | 34.3 (15.6) | 34.9 (15.8) |
| Vent, lb/h (kg/h) | 1.7 (0.77) | 3.3 (1.5) | 1.0 (0.45) | 1.3 (0.59) | 2.0 (0.91) |
| Mother Liquor, lb/h (kg/hr) | 122 (55.3) | 122 (55.3) | 121 (54.9) | 124 (56.2) | 123 (55.8) |
| Vapor $H_2/C_2$ Ratio | 0.17 | 0.054 | 0.17 | 0.14 | 0.21 |
| Butene, lb/h (g/h) | 0.11 (50) | 0 | 0.14 (63) | 0.51 (230) | 0.40 (180) |
| Powder HLMI (dg/min) | 9.6 | 4.8 | 15.0 | 15.8 | 10.2 |
| Powder Density (g/cc) | 0.9569 | 0.9587 | 0.9585 | 0.9555 | 0.9547 |
| Pellet HLMI (dg/min) | 5.2 | 2.6 | 7.7 | 9.0 | 5.7 |
| Pellet Density (g/cc) | 0.9584 | 0.9597 | 0.9582 | 0.9547 | 0.9552 | tion catalysts are produced by a) generating a reaction product A by contacting a magnesium dialkoxide compound with a halogenating agent; b) contacting reaction product A with a first halogenating/titanating agent to form reaction product B; c) contacting reaction product B with a second halogenating/titanating agent to form reaction product C; and d) contacting reaction product C with a third halogenating/titanating agent to form catalyst component D.

The processes and resins of the polymers and methods for making them will now be described in greater detail with reference to the following non-limiting Examples.

Production Conditions

In experiments 1 through 5, the catalysts described above are used to make several bimodal resins for large part blow molding applications. The polyolefin pilot plant is run at 49/51 split and 500 dg/min target for $MI_5$ from the first reactor. The second reactor fluff HLMI is targeted. Five different conditions are run with reactor two fluff HLMI ranging from 5 to 16 dg/min and a fluff density ranging from 0.955 to 0.959 dg/min. Samples are collected at each condition. Upon extrusion of the samples, the HLMI dropped by an average of 46% (according to reactor two fluff HLMI) and the density increased slightly, by an average of 0.0004 g/cc. Table I below presents a summary of the production conditions during each condition tested.

Figure 2:
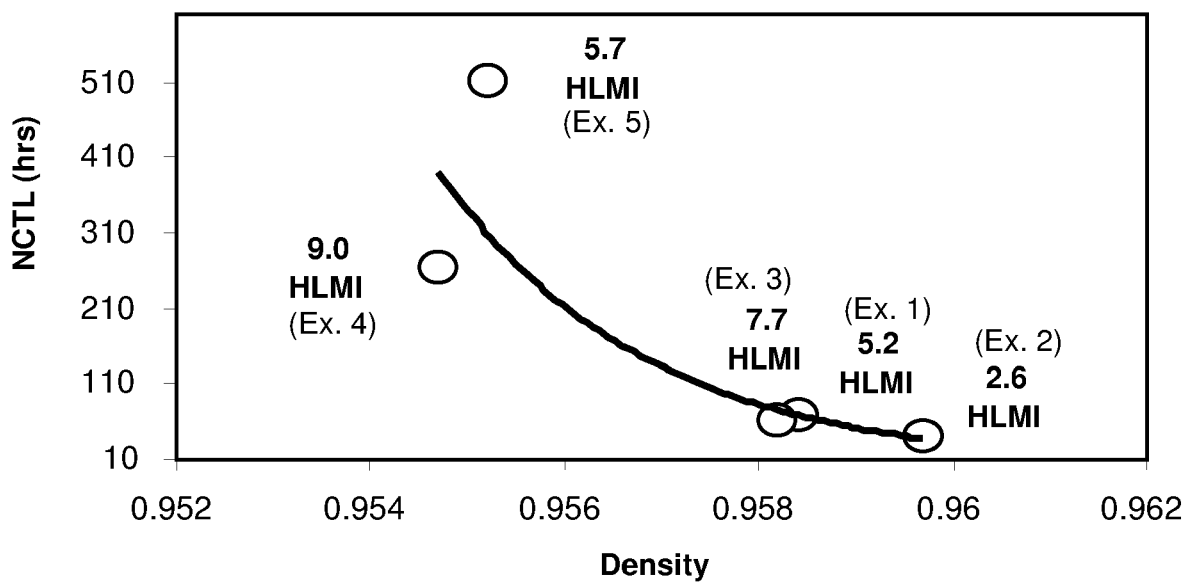
FIG. 2 is a graph of NCTL results for experimental bimodal drum resins as a function of density.

The average residence time for each experiment in Reactor One was 2.8 hours. The fresh hexane feed to Reactor One was Resin Physical Property Evaluations Evaluation of the resin physical properties included ESCR as measured using ASTM D 1693, condition B, Notched Constant Tensile Load (NCTL) as measured using ASTM D5397 and Flexural/Tensile properties as measured using ASTM D638. NCTL is a slow crack growth resistance test (similar to ESCR) to see how fast a uniform notch spreads in contact with high stress or aggressive liquids such as those described previously and run according to ASTM D5397. ESCR and NCTL testing results indicate that the bimodal resins show a significant improvement of slow crack growth resistance over FINA TR-570 polyethylene at an equivalent density. FIGS. 1, 2 and Table II show the results. Excellent agreement between ESCR and NCTL is seen. Based on this data it may be estimated that a bimodal resin made under these conditions with a 0.956 density (where FINA TR-570 polyethylene density=0.954) and having a similar HLMI to TR-570 will have roughly a 250% improvement in stress crack performance.

TABLE II

ESCR and NCTL results for Bimodal Drum Resins and TR-570

| | ESCR F50 (hrs) Cond. B 10% Igepal | Density (g/cc) | HLMI (dg/min) | NCTL (hrs) |
|---|---|---|---|---|
| TR-570 | 250 | 0.954 | 6.1 | — |
| Ex. 1 | 221 | 0.9594 | 5.2 | 68 |
| Ex. 2 | 105 | 0.9597 | 2.6 | 41 |

TABLE II-continued

ESCR and NCTL results for Bimodal Drum Resins and TR-570

|  | ESCR F50 (hrs) Cond. B 10% Igepal | Density (g/cc) | HLMI (dg/min) | NCTL (hrs) |
|---|---|---|---|---|
| Ex. 3 | 224 | 0.9582 | 7.7 | 62 |
| Ex. 4 | 774 | 0.9547 | 9.0 | 264 |
| Ex. 5 | >1200 | 0.9552 | 5.7 | 514 |

Figure 3:
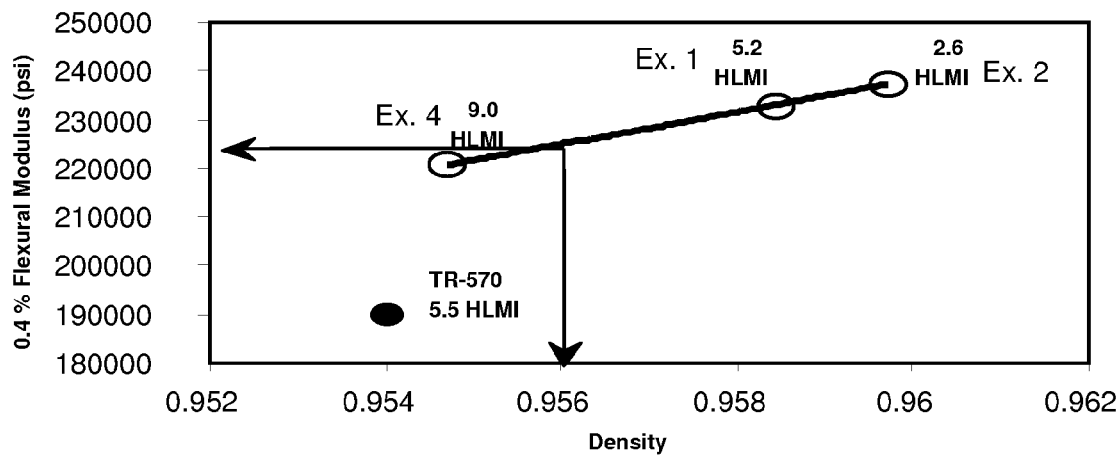
FIG. 3 is a graph of Flexural Modulus (at 0.4% strain) for experimental bimodal drum resins of Examples 1, 2 and 4 as a function of density, and as compared to TR-570.
Figure 4:
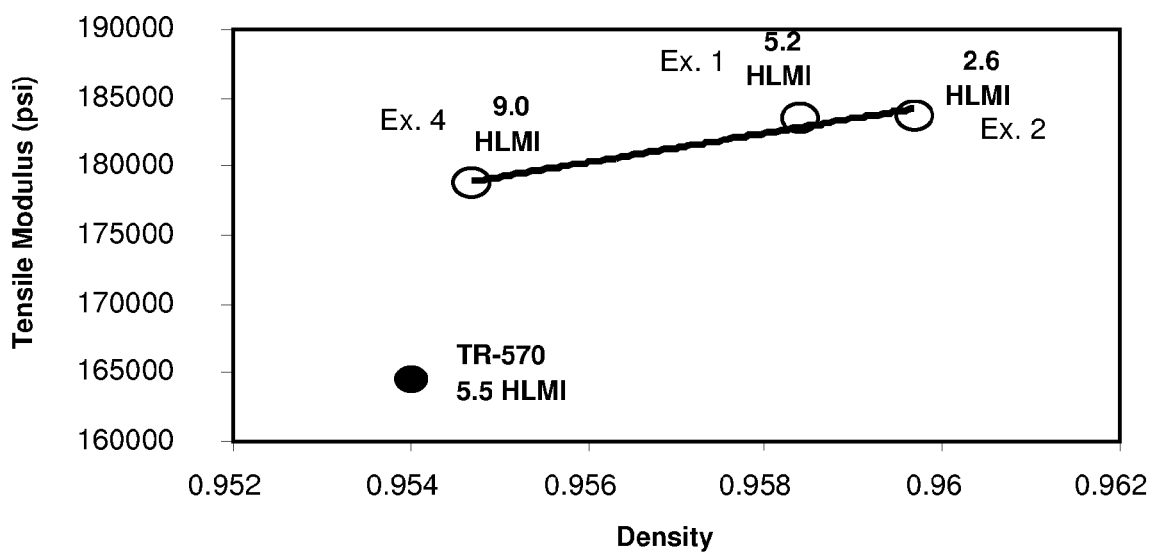
FIG. 4 is a graph of Tensile Modulus for experimental bimodal drum resins of Examples 1, 2 and 4 as a function of density, and as compared to TR-570.

The results for tensile and flex testing are shown in FIGS. 3, 4, and Table III. Flexural and tensile modulus data show that surprisingly the experimental bimodal drum grades have a significantly higher stiffness at a given density than TR-570. Taking advantage of the superior stress crack resistance of the experimental drum grades over TR-570, further improvements in relative stiffness could be obtained by targeting a higher density while still maintaining a significant stress crack advantage. For example, at 0.956 density the bimodal drum grade has roughly a 20% higher flexural modulus than TR-570 (density=0.954).

TABLE III

Tensile and Flexural Modulus Results for Bimodal Drum Resins and TR-570

|  | HLMI (dg/min) | HLMI pellet density (g/cc) | 0.4% Strain Flex. Mod., psi (MPa) | Tens. Mod. psi, (MPa) |
|---|---|---|---|---|
| TR-570 | 6.1 | 0.954 | 190,000 (1310) | 164,500 (1134) |
| Ex. 1 | 5.2 | 0.9594 | 232,800 (1605) | 183,472 (1263) |
| Ex. 2 | 2.6 | 0.9597 | 237,400 (1637) | 183,800 (1267) |
| Ex. 3 | 7.7 | 0.9582 | — | — |
| Ex. 4 | 9.0 | 0.9547 | 220,800 (1522) | 178,800 (1232) |
| Ex. 5 | 5.7 | 0.9552 | — | — |

Resin Processing Performance

Processing performance evaluations were carried out in order to assess the performance of the experimental bimodal drum grades relative to TR-570. These evaluations included tests of throughput, melt strength and melt fracture characteristics.

Figure 5:
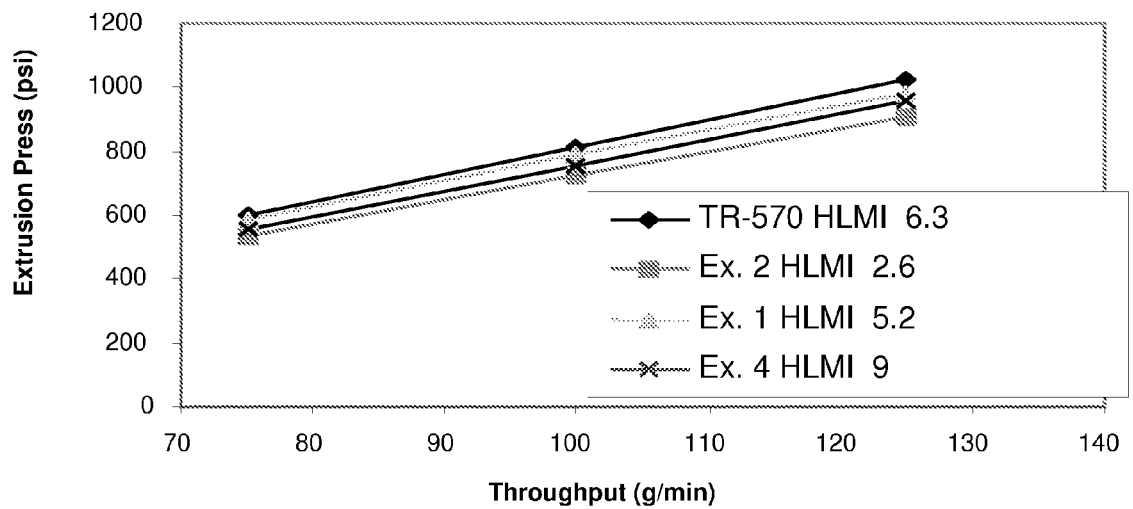
FIG. 5 is a graph of extrusion pressure as a function of throughput for the experimental bimodal drum resins of Examples 1, 2 and 4, and as compared to TR-570.
Figure 6:
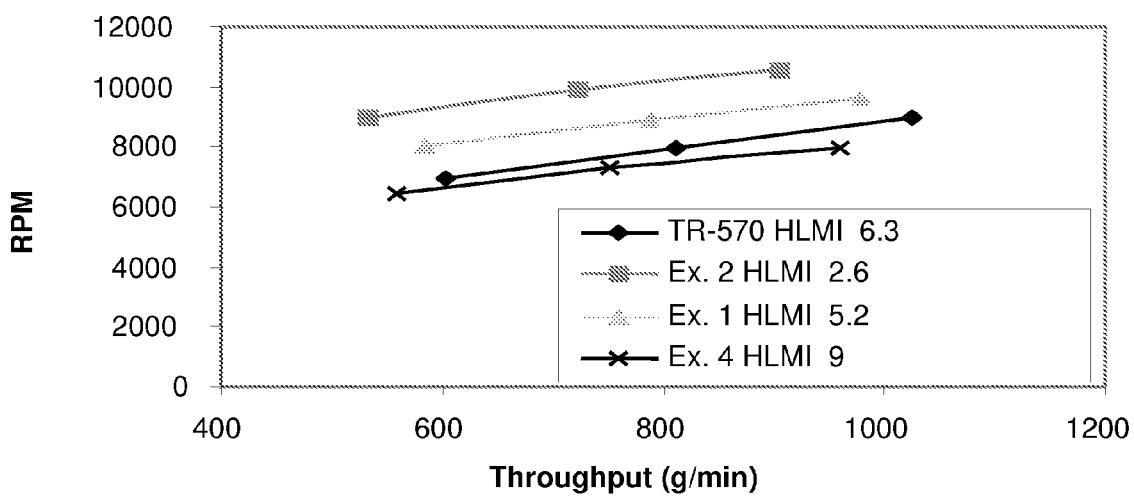
FIG. 6 is a graph of RPM as a function of throughput for the experimental bimodal drum resins of Examples 1, 2 and 4, and as compared to TR-570.
Figure 7:
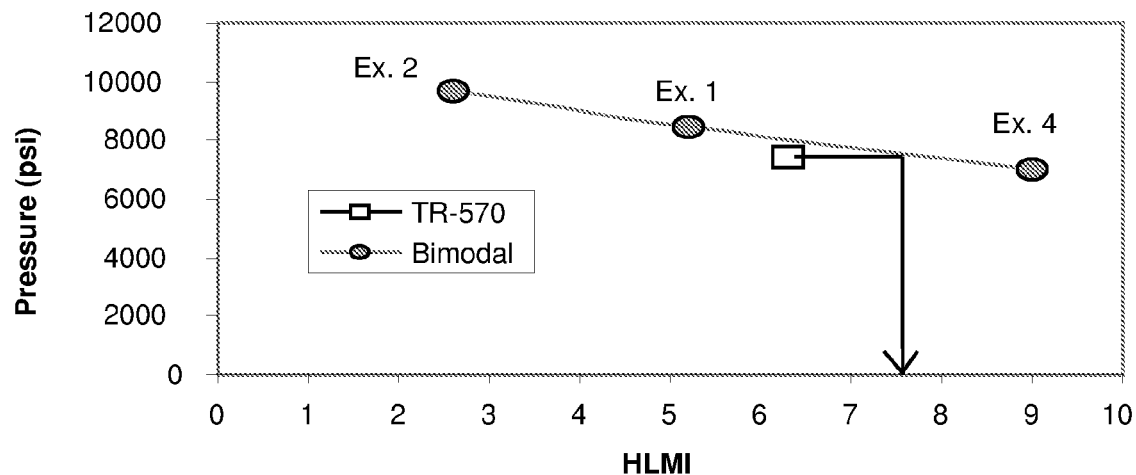
FIG. 7 is a graph of pressure as a function of HLMI for a constant throughput of 700 g/min for the experimental bimodal drum resins of Examples 1, 2 and 4, and as compared to TR-570.

Throughput evaluations were carried out in order to estimate the HLMI for a bimodal drum grade which is necessary to achieve the same throughput at a given extrusion pressure. Since a predominant number of drum manufacturers utilize blow molders with grooved barrel extruders, throughput experiments were carried out on an Alpine film line that utilizes a grooved barrel extruder. Based on the data shown in FIG. 5, the effect of HLMI-throughput relationship seems to be similar for the bimodal drum resins as for TR-570. On the other hand, it is clear that there is a throughput per extruder RPM penalty for the bimodal resins as can be seen in FIG. 6. Since typical throughput constraints are related to pressure, the data shown in FIG. 6 is not of significant concern and is most likely a consequence of the pellet cut difference between a plant extruded TR-570 and lab compounded bimodal drum resins (stand pellet cut).

Figure 8:
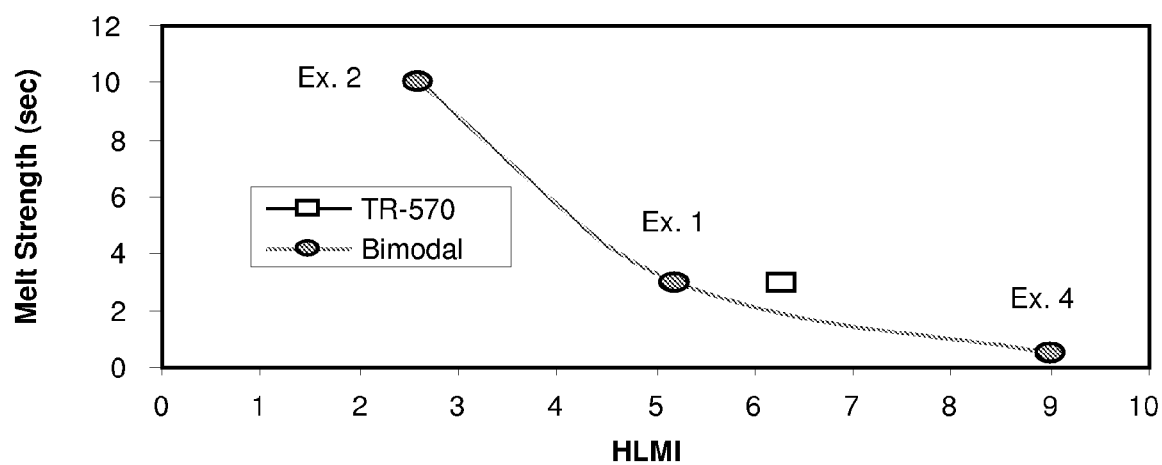
FIG. 8 is a graph of melt strength by extruded strand method as a function of HLMI for the experimental bimodal drum resins of Examples 1, 2 and 4, and as compared to TR-570.

The relative melt strength of the bimodal drum resins relative to TR-570 was measured using an extruded strand method. This experiment was carried out using a Brabender bench top extruder fitted with a 15 L/D capillary die. A strand of a given length and weight was extruded, and then the time for the strand to sag a given distance was recorded. Although this test could be considered somewhat arbitrary, the relative melt strengths (resistance to sag) between resins may be accurately established. The results from this experiment are shown in FIG. 8. Similarly to the throughput-HLMI relationship, a roughly 1 HLMI unit offset in melt strength between the bimodal drum resin and TR-570 are observed. Specifically, it may be seen that a bimodal drum resin at a HLMI of 5.2 has the same melt strength as a TR-570 resin at a HLMI of 6.1. Targeting the TR-570 HLMI+1 in order to obtain equivalent pressure limited throughput as discussed above would result in a bimodal drum resin with equivalent melt strength to that of TR-570.

Figure 9:
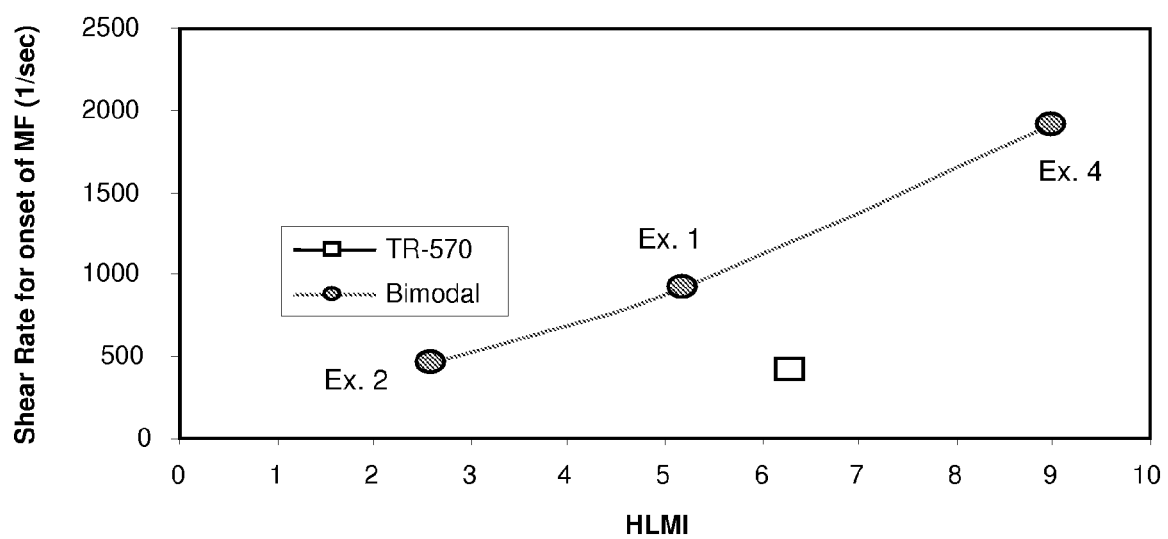
FIG. 9 is a graph of the shear rate of the onset of melt fracture as a function of HLMI for the experimental bimodal drum resins of Examples 1, 2 and 4, and as compared to TR-570.

The last processing related evaluation performed was an examination of melt fracture characteristics of the resins. This experiment was also performed on the bench top Brabender extruder using the 1.5 L/D die. In this experiment the relative difference between the onset of melt fracture for each resin was obtained by incrementally increasing extruder RPM until the onset of melt fracture was observed. Using the throughput at the onset the shear rate for onset of MF was calculated. This data is shown plotted in FIG. 9. It can be seen that in this test, the bimodal drum grades showed a significantly higher shear rate for the onset of MF than TR-570 at a given HLMI.

In the foregoing specification, the polymer resins and methods for making them have been described with reference to specific embodiments thereof, and has been demonstrated as effective in providing methods for preparing polymerization catalysts. However, it will be evident that various modifications and changes may be made to the methods and copolymers without departing from the broader spirit or scope of the invention as set forth in the appended claims. Accordingly, the specification is to be regarded in an illustrative rather than a restrictive sense. For example, specific catalysts, monomer proportions, and other components falling within the claimed parameters, but not specifically identified or tried in a particular bimodal copolymer preparation method, are anticipated and expected to be within the scope of this invention. In particular, the process of producing polyolefins may be conducted under conditions (temperature, pressure, feed rates, etc.) other than those exemplified herein.

What is claimed is:

1. A process for producing a bimodal high density polyethylene in two reactors in series, comprising:
    homopolymerizing in a first reactor from ethylene in the presence of hydrogen and a Ziegler-Natta polymerization catalyst;
    polymerizing in a second, serially connected, downstream reactor a second polyethylene product from ethylene and from about 0 wt % to 3 wt % of an α-olefinic comonomer comprising from 3 to 8 carbon atoms, based on the total weight of ethylene monomer, wherein the polymerization processes are carried out at a temperature of from about 38° C. to about 93° C., under an absolute pressure of from about 100 kPa to about 10,000 kPa, and the homopolymerization in the first reactor is carried out at a higher temperature than that of the second reactor; and
    recovering bimodal polyethylene having a density ranging from about 0.955 g/cc to about 0.959 g/cc, a high load melt index (HLMI) of from about 2 dg/min to about 30 dg/min, an environmental stress cracking resistance (ESCR) of from about 400 hours to about 2500 hours, and a 0.4% flexural modulus of from about 180,000 psi to about 260,000 psi (1,200 MPa to about 1,800 MPa).

2. The process of claim 1 where the comonomer is present and comprises 1-butene.

3. The process of claim 1 wherein a lower molecular weight polyethylene fraction is produced in the first reactor that comprises from about 30% to about 70% by weight of the total polyethylene produced in the first and second reactors.

4. The process of claim 1 wherein the ethylene monomer in the second reactor comprises from about 0.1% to about 2% by weight, and the comonomer comprises from about 0.1 to about 2% by weight, each based on the total weight of the monomer and comonomer in an inert diluent.

5. The process of claim 1 wherein the Ziegler-Natta polymerization catalyst is prepared by a process including:
   preparing a dialkoxide as the reaction product of a metal dialkyl and an alcohol;
   preparing a soluble catalyst precursor as the reaction product of the metal dialkoxide and a halogenating/titanating agent;
   combining the prepared dialkoxide with the prepared soluble catalyst precursor; and
   precipitating a solid catalyst component as the reaction product of the soluble catalyst precursor and a precipitating agent.

6. The process of claim 1 wherein the Ziegler-Natta polymerization catalyst is supported on a magnesium support.

7. The process of claim 1 further comprising using an aluminum alkyl co-catalyst in the first reactor, second reactor, or both the first and second reactors.

8. The process of claim 7 wherein the aluminum alkyl co-catalyst is selected from the group consisting of triethyl aluminum (TEAl); triisobutyl aluminum (TIBAL); Al(n-octyl)(O-Bu)$_2$; tri-n-hexyl aluminum; tri-n-octyl aluminum (TNOAL); and mixtures thereof.

9. A bimodal high density polyethylene resin produced by a process comprising:
   homopolymerizing in a first reactor a first polyethylene product from ethylene in the presence of hydrogen and a Ziegler-Natta polymerization catalyst, wherein the Ziegler-Natta polymerization catalyst is prepared by a process including:
      preparing a dialkoxide as the reaction product of a metal dialkyl and an alcohol;
      preparing a soluble catalyst precursor as the reaction product of the metal dialkoxide and a halogenating/titanating agent;
      combining the prepared dialkoxide with the prepared soluble catalyst precursor; and
      precipitating a solid catalyst component as the reaction product of the soluble catalyst precursor and a precipitating agent;
   polymerizing in a second serially connected, downstream reactor a second polyethylene product from ethylene and from about 0 to 3 wt % of an α-olefinic comonomer comprising from 3 to 8 carbon atoms, based on the total weight of ethylene monomer; and
   recovering bimodal polyethylene having a density ranging from about 0.955 to about 0.959 g/cc, a high load melt index (HLMI) of from about 2 to about 30 dg/min, an environmental stress cracking resistance (ESCR) of from about 400 to about 2500 hours, and a 0.4% flexural modulus of from about 180,000 to about 260,000 psi (1,200 MPa to about 1,800 MPa).

10. The bimodal high density polyethylene resin of claim 9 where the comonomer is present and comprises 1-butene.

11. The bimodal high density polyethylene resin of claim 9 where the polymerization processes are carried out at a temperature of from about 38° C. to about 93° C., under an absolute pressure of from 100 kPa to 10,000 kPa, and the homopolymerization in the first reactor is carried out at a higher temperature than the copolymerization in the second reactor.

12. The bimodal high density polyethylene resin of claim 9 where in the first reactor, the ethylene monomer comprises from 0.1 to 3% by weight based on the total weight of the ethylene monomer in an inert diluent and the hydrogen comprises from 0.1 to 2 mol % based on the total weight of the ethylene monomer.

13. The bimodal high density polyethylene resin of claim 9 where a lower molecular weight polyethylene fraction produced in the first reactor comprises from 30 to 70% by weight of the total polyethylene produced in the first and second reactors.

14. The bimodal high density polyethylene resin of claim 9 where the bimodal polyethylene has a density ranging from about 0.955 g/cc to about 0.959 g/cc, a HLMI of from about 3 dg/min to about 16 dg/min, an ESCR of from about 400 hours to about 1200 hours, and a 0.4% flexural modulus of from about 220,000 psi to about 240,000 psi (about 1,500 MPa to about 1,600 MPa).

15. The bimodal high density polyethylene resin of claim 14 where the bimodal polyethylene has a HLMI of from about 4 dg/min to about 10 dg/min.

16. An article made from the resin of claim 9 by a process selected from the group of processes consisting of blow-molding, injection-molding, extrusion, transfer compression molding, and thermoforming.

17. The blow-molded article of claim 16, where the article is selected from the group consisting of a drum, a tube, a profile, a pipe, and a combination thereof.

18. The blow-molded article of claim 17, where the article is a drum.

* * * * *